US009148337B2

(12) United States Patent
Sawal et al.

(10) Patent No.: US 9,148,337 B2
(45) Date of Patent: Sep. 29, 2015

(54) SYSTEM AND METHOD FOR RAPID PEER NODE FAILURE DETECTION

(71) Applicant: Dell Products L.P., Round Rock, TX (US)

(72) Inventors: Vinay Sawal, Fremont, CA (US); Mukesh Moopath Velayudhan, Fremont, CA (US); Vivek Dharmadhikari, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 13/750,760

(22) Filed: Jan. 25, 2013

(65) Prior Publication Data

US 2014/0211637 A1     Jul. 31, 2014

(51) Int. Cl.
*H04L 12/24*     (2006.01)
*H04L 12/26*     (2006.01)
*G06F 11/30*     (2006.01)
*G06F 11/07*     (2006.01)

(52) U.S. Cl.
CPC ............ *H04L 41/04* (2013.01); *G06F 11/0751* (2013.01); *G06F 11/30* (2013.01); *H04L 41/06* (2013.01); *H04L 43/0817* (2013.01); *H04L 43/10* (2013.01)

(58) Field of Classification Search
CPC .................................................... H04L 41/0686
USPC .......................................................... 370/244
See application file for complete search history.

(56) References Cited

U.S. PATENT DOCUMENTS

| 8,726,049 | B2 * | 5/2014 | Kasahara et al. | 713/300 |
| 2005/0257213 | A1 * | 11/2005 | Chu et al. | 717/170 |
| 2011/0122888 | A1 * | 5/2011 | Saklecha et al. | 370/413 |

OTHER PUBLICATIONS

IPMI—Intelligent Platform Management Interface Specification Second Generation v2.0, Jun. 12, 2009, Intel Hewlett-Packward NEC Dell, pp. iv, 12, 13 and 29-34.*
Zhilou Yu et al., 'Research of IPMI Management based on BMC SOC', 2010, IEEE, pp. 1-3.*
IPMI Intelligent Platform Management Interface Specification Second Generation v2.0, Document Revision 1.0, Feb. 12, 2004, (Jun. 12, 2009 Markup), Intel Hewlett-Packard NEC Dell, p. 14.*

* cited by examiner

*Primary Examiner* — Melvin Marcelo
(74) *Attorney, Agent, or Firm* — Haynes and Boone, LLP

(57) ABSTRACT

A system and method for rapid peer node failure detection including a network switching unit that includes a network processing unit configured to receive and forward network traffic using one or more ports, a host CPU coupled to the network processing unit and configured to manage the network processing unit, a link controller coupled to the host CPU and configured to couple the network switching unit to a peer network switching unit using a management link, and a baseboard management controller (BMC) coupled to the host CPU and the link controller. The link controller is separate and independent from the network processing unit. The BMC is configured to monitor the host CPU and the network switching unit, detect a failure in the network switching unit, and notify the peer network switching unit of the detected failure using the management link.

20 Claims, 4 Drawing Sheets

SYSTEM AND METHOD FOR RAPID PEER NODE FAILURE DETECTION

BACKGROUND

The present disclosure relates generally to information handling systems, and more particularly to rapid peer node failure detection.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. This can be further complicated through other networking trends such as network virtualization.

Many networks utilize parallelization and other techniques to improve the forwarding function between two network nodes. By employing parallelization, redundancy is built into a network so that it is possible that more than one path exists between any two nodes. This provides suitably aware network switching products with the ability to select between the redundant paths to avoid network congestion, balance network loads, or to avoid failures in the network. Parallelization also provides the ability to handle more network traffic between two nodes than is possible when parallelization is not utilized. In some implementations the parallelization is treated in a more formalized fashion using virtual link trunking (VLT). In VLT, multiple network links and/or nodes are often bundled into a group to support the parallelization function. For suitably aware network switching products, the VLT can offer a flexible option to select any of the network links in the VLT. The network switching products may also ignore the VLT and treat the network links as separate links and utilize them in a more traditional fashion. And while VLTs offer additional flexibility in network topologies they also add complexity to the forwarding function.

One function of network switching products is to deal with failures in the networks they are receiving network packets from or forwarding packets to. In some examples, the network switching products should be able to deal with failures in the hardware and/or software of neighboring network switching products.

Accordingly, it would be desirable to provide improved network switching products that can rapidly detect and respond to network failures.

SUMMARY

According to one embodiment, a network switching unit includes a network processing unit configured to receive and forward network traffic using one or more ports, a host CPU coupled to the network processing unit and configured to manage the network processing unit, a link controller coupled to the host CPU and configured to couple the network switching unit to a peer network switching unit using a management link, and a baseboard management controller (BMC) coupled to the host CPU and the link controller. The link controller is separate and independent from the network processing unit. The BMC is configured to monitor the host CPU and the network switching unit, detect a failure in the network switching unit, and notify the peer network switching unit of the detected failure using the management link.

According to another embodiment, a method of failure notification using a baseboard management controller (BMC) includes monitoring a network switching unit, the network switching unit including a network processing unit for receiving and forwarding network traffic using one or more ports and a host CPU coupled to the network processing unit and managing the network processing unit, detecting a failure in the network switching unit, and notifying a peer network switching unit of the detected failure. The peer network switching unit is coupled to the BMC using a management link controlled by a link controller that is separate and independent from the network processing unit.

According to yet another embodiment, an information handling system includes a network switching unit. The network switching unit includes a network processing unit configured to receive and forward network traffic using one or more ports, a host CPU coupled to the network processing unit and configured to manage the network processing unit, a link controller coupled to the host CPU and configured to couple the network switching unit to a peer network switching unit using a management link, and a baseboard management controller (BMC) coupled to the host CPU and the link controller. The link controller is separate and independent from the network processing unit. The BMC is configured to monitor the host CPU and the network switching unit, detect a failure in the network switching unit, and notify the peer network switching unit of the detected failure using the management link.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
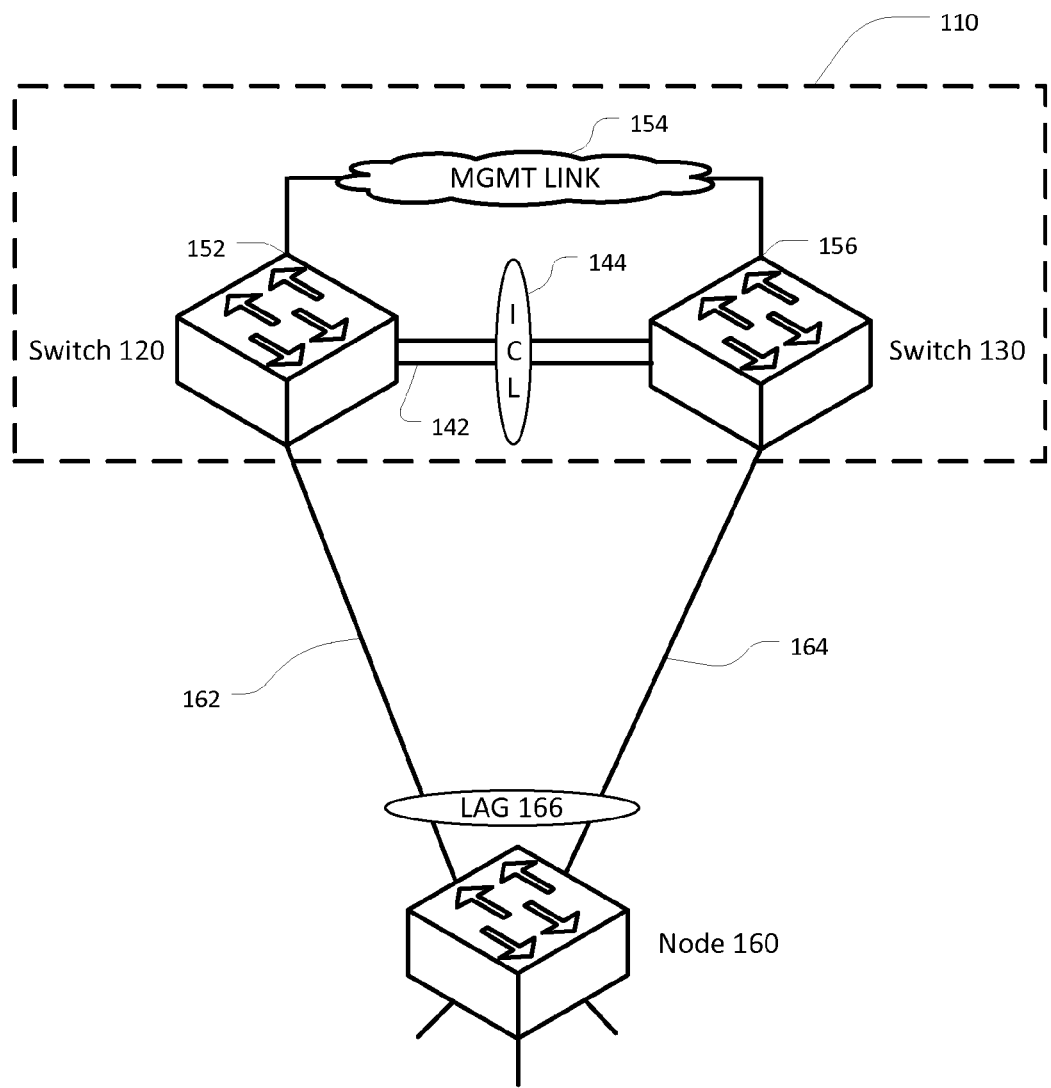
FIG. 1 shows a simplified diagram of a network peer domain according to some embodiments.

FIG. 1 shows a simplified diagram of a network peer domain 110 according to some embodiments. As shown in FIG. 1, the network peer domain or cluster 110 may include a first network switching unit or switch 120 and a second network switching unit or switch 130. In some examples, the switches 120 and 130 may be peer nodes or peer switches. The switch 120 may include one or more ports coupled to one or more corresponding network links 142. Similarly, the switch 130 may include one or more ports coupled to corresponding ones of the one or more network links 142. Together, the network links 142 may form an inter chassis link (ICL) 144 between the switch 120 and the switch 130. The ICL 144 may be used by either the switch 120 or the switch 130 to share routing, forwarding, and other configuration information. In some examples, this information may include MAC, ARP, and/or multicast entries and the like. In some examples, this information may be exchanged periodically between the switches 120 and 130 to allow for proper ongoing operation of the network peer domain 110. In some embodiments, the ICL 144 may additionally be used to provide a path for forwarding network traffic being handled by either of the switches 120 or 130.

In some embodiments, the switch 120 may also include a connection 152 for coupling the switch 120 to a separate management link 154. Similarly, the switch 130 may also include a connection 156 for coupling the switch 130 to the management link 154. In some embodiments, the management link 154 may provide a mechanism that allows the switch 120 and the switch 130 to communicate, which is separate from the network links 142 and the ICL 144. In some embodiments, the management link 154 may be an Ethernet. In some embodiments, the management link 154 may use any suitable communication network type. According to some embodiments, the switch 120 and the switch 130 may use the management link 154 to monitor a status of its peer switches. In some examples, switch 120 may monitor the status of its peer switch 130. In some examples, the switch 130 may monitor the status of its peer switch 120.

According to some embodiments, the network peer domain 110 may be coupled to one or more neighboring network switching units or nodes. FIG. 1 shows a representative node 160. Node 160 may be coupled to switch 120 using a network link 162 and to switch 130 using a network link 164. The node 160 may combine the network links 162 and 164 into a link aggregation group (LAG) 166, thus treating its connections to the network peer domain 110 as a VLT.

According to some embodiments, the need to monitor the status of peer switches may be important. In some examples, a failure of a peer switch may result in the loss of network traffic that is being handled by the peer switch. In some examples, the failure of the peer switch may result in a loss of routing, forwarding, and/or configuration information that would have been received over the ICL. In some examples, the failure may also impact the routing and/or forwarding behavior of neighboring nodes such as node 160. In some examples, the failure may additionally impact additional nodes coupled to node 160 in a ripple-like effect. The longer the failure of the peer switch is not detected and not corrected for in the network, the greater a detrimental impact the failure may have on the network around a network peer domain such as network peer domain 110. Consequently, it would be advantageous to be able to rapidly detect the failure in a peer switch.

According to some embodiments, the failure in a peer switch may be detected using a heartbeat mechanism. In the heartbeat mechanism, the switch 120 may periodically broadcast a heartbeat message, on the management link 154, indicating that the switch 120 may be up and running properly. In some examples, the heartbeat message may be broadcast at approximately regular intervals. In some examples, the intervals may be approximately 1 second in length. The switch 130 may monitor the management link 154 and detect the heartbeat message from the switch 120. In some examples, the switch 130 may use a timeout mechanism to determine that the switch 120 may no longer be up and running. In some examples, the switch 130 may wait for a period of several intervals in which the heartbeat message is not received before determining that the switch 120 may no longer be up and running. In some examples, the switch 130 may wait for a period of three or more intervals. In some examples, the period is three seconds or longer in duration. In some embodiments, the switch 130 may similarly be broadcasting its own heartbeat message on the management link 154, which may be monitored by the switch 120 to determine whether the switch 130 may be up and running.

According to certain embodiments, the heartbeat mechanism may too slow to detect the failure in the peer switch. In some examples, where it takes three seconds or longer to detect the failure, a significant amount of network traffic, 3 gigabits or more may be lost. In some examples, this long delay may also allow the ripple-like effects to adversely impact too much of the network. Consequently, it would be advantageous to be able to detect the failure in the peer switch more rapidly than may be possible with the heartbeat mechanism.

Figure 2:
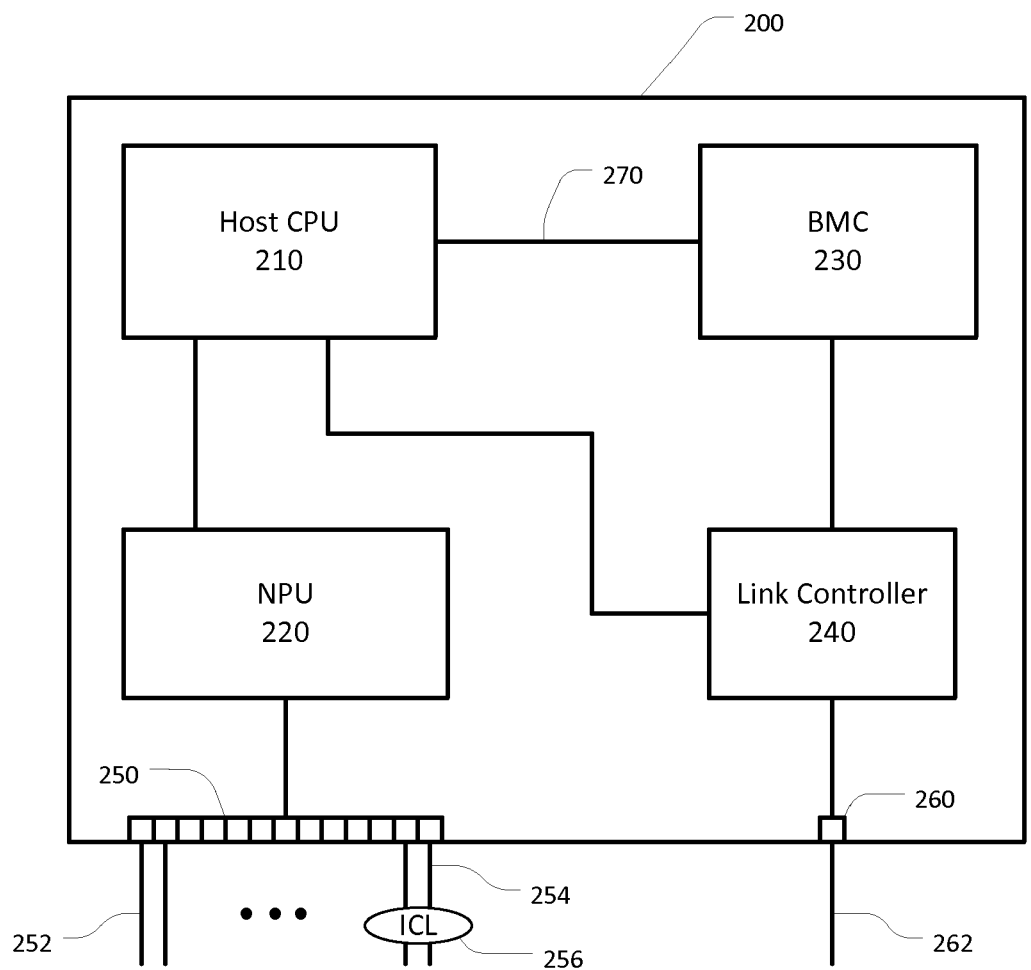
FIG. 2 shows a simplified diagram of a network switching unit according to some embodiments.

FIG. 2 shows a simplified diagram of a network switching unit 200 according to some embodiments. As shown in FIG. 2, the network switching unit or switch 200 may include a host CPU 210, a network processing unit (NPU) 220, a baseboard management controller (BMC) 230, a link controller 240, a plurality of communication ports 250, and a management link connection 260. The host CPU 210 may handle normal switching behavior for the switch 200. In some examples, the host CPU 210 may direct receiving and/or forwarding of network traffic to network nodes such as node 160. In some examples, the host CPU 210 may exchange routing, forwarding, and/or configuration information and/or network traffic with one or more peer switches using an ICL or other network links. In some examples, the host CPU 210 may execute computer code stored in non-transient, tangible, machine readable media that may include an operating system, firmware, and/or other computer software that may implement, at least in part, functionality required by the host CPU 210.

In some embodiments, the host CPU 210 may be coupled to the NPU 220 using a bus or other communication connection. In some examples, the host CPU 210 may be coupled to the NPU 220 using a peripheral component interface express (PCIe) bus or other bus. The NPU 220 may exchange network traffic with other devices using the plurality of communication ports 250. In some examples, one or more of the communication ports selected from the communication ports 250 may be coupled to one or more corresponding network links 252 that may couple the switch 200 to other network nodes, such as the node 160. In some examples, one or more of the communication ports selected from the communication ports 250 may be coupled to one or more corresponding network links 254 that may be coupled to a peer switch and form an ICL 256.

In some embodiments, the host CPU 210 and/or the BMC 230 may be coupled to the link controller 240. The link controller 240 may be coupled to one or more communication ports 260 which may be coupled to a network link 262. The network link 262 may be coupled to a management link 264 coupled to the peer switch. In some examples, the link controller 240 may be an Ethernet controller.

In some embodiments, the BMC 230 may be monitoring and/or controlling other devices (not shown) included in the switch 200. In some examples, the BMC may use an Intelligent Platform Management Interface (IPMI) to monitor and/or control the other devices. In some examples, the BMC may be coupled to one or more Inter-Integrated Circuit (I2C), one or more System Management Bus (SMBus), and/or other similar networks to monitor and/or control the other devices. In some examples, the other devices may include power supplies, temperature sensors, cooling fans, and/or the like. In some embodiments, the BMC 230 may monitor the other devices to monitor and/or determine a status of the host CPU 210 and/or the switch 200. In some embodiments, the BMC 230 may receive power from a secondary power supply separate from a power supply used to power the host CPU 210 and/or other portions of the switch 200. In some examples, the BMC 230 may continue to function when power is lost to the host CPU and/or the other portions of the switch 200.

In some embodiments, the host CPU 210 may also be coupled to the BMC 230 using a status link 270. In some examples, the host CPU 210 may be coupled to the BMC 230 using one or more status links 270 selected from a group consisting of an UART-based serial bus, a general purpose I/O (GPIO) line, a serial peripheral interface (SPI), a universal serial bus (USB), a PCI bus, a PCIe bus, an ethernet, and the like. In some examples, the BMC 230 may use the status link 270 to monitor the status of the host CPU 210.

In some embodiments, the BMC 230 may determine the status of the host CPU 210 using one of several mechanisms. For the purposes of illustration, these mechanisms will be described below in the context where the status link 270 may be a GPIO line on the host CPU 210 and an interrupt input line on the BMC, but other variations are possible depending on characteristics of other possible status links 270.

In some examples, a failure in an operating system of the host CPU 210 may be detected. The operating system of the host CPU 210 may include an operating system crash/panic handler that may be executed when the operating system of the host otherwise fails. The operating system crash/panic handler may toggle the GPIO line and trigger an interrupt in the BMC 230. In some examples, the operating system crash/panic handler may be executed within 100 ms or less after the operating system failure. In some examples, a delay before executing the operating system crash/panic handler is configurable.

In some examples, an OS watchdog timer in the host CPU 210 may no longer be receiving OS heartbeat indications from the operating system of the host 210 and timeout, indicating an operating system hang. A handler for the OS watchdog timer may toggle the GPIO line and trigger the interrupt in the BMC 230. In some examples, the OS watchdog timer may timeout and the handler may be executed within 100 ms or less after the operating system hang. In some examples, a timeout period of the OS watchdog timer may be configurable.

In some examples, one or more process watchdog timers in the host CPU 210 may no longer be receiving process heartbeat indications from one or more processes being executed on the host CPU 210 and timeout. Handlers for the process watchdog timers may toggle the GPIO line and trigger the interrupt in the BMC 230. In some examples, the process watchdog timers may timeout and the respective handlers may be executed within 250 ms to 500 ms or less after the loss of process heartbeat indications. In some examples, timeout periods of the process watchdog timers may be configurable.

In some examples, a shutdown operation in the host CPU 210 may be detected. In some examples, the shutdown operation may be triggered by a shutdown command received from a user. The shutdown handler may toggle the GPIO line and trigger the interrupt in the BMC 230.

In some examples, the status link 270 may also receive status information from devices other than the host CPU 210 and its GPIO line. In some examples, the status link may also be coupled to an external watchdog timer. The external watchdog timer may trigger an interrupt in the BMC 230 when the external watchdog timer is no longer receiving host heartbeat indications from the host CPU 210. In some examples, the external watchdog timer may timeout and the handler may be executed within 100 ms or less after the loss of host heartbeat indications. In some examples, a timeout period of the external watch dog timer may be configurable.

In some embodiments, an interrupt handler included in the BMC 230 may execute when the BMC 230 receives the interrupt. The interrupt handler may generate a failure notification message to be sent on the network link 262. The failure notification message may be received by the peer switch to notify the peer switch that the switch 200 has failed.

In some examples, the failure notification message may be sent as quickly as 100 ms or less after the failure in the switch 200 depending upon the type of failure and the configuration of corresponding timeout periods.

In some embodiments, failures and/or problems detected using the IPMI may additionally generate and send the failure notification message.

As discussed above and further emphasized here, FIG. 2 is merely an example, which should not unduly limit the scope of the claims. One of ordinary skill in the art would recognize many variations, alternatives, and modifications. According to some embodiments, the host CPU 210 may include one or more processors. In some examples, each of the one or more processors may include its own separate operating system crash/panic handler, OS watchdog timer, process watchdog timers, shutdown handler, and/or external watchdog timer. According to some embodiments; the BMC 230 may include one or more processors. According to some embodiments, the status link 270 may include a plurality of lines with each line communicating one or more of the possible failure indications to the BMC 230. In some examples, each of the plurality of lines may be coupled to different interrupt input lines of the BMC 230.

Figure 3:
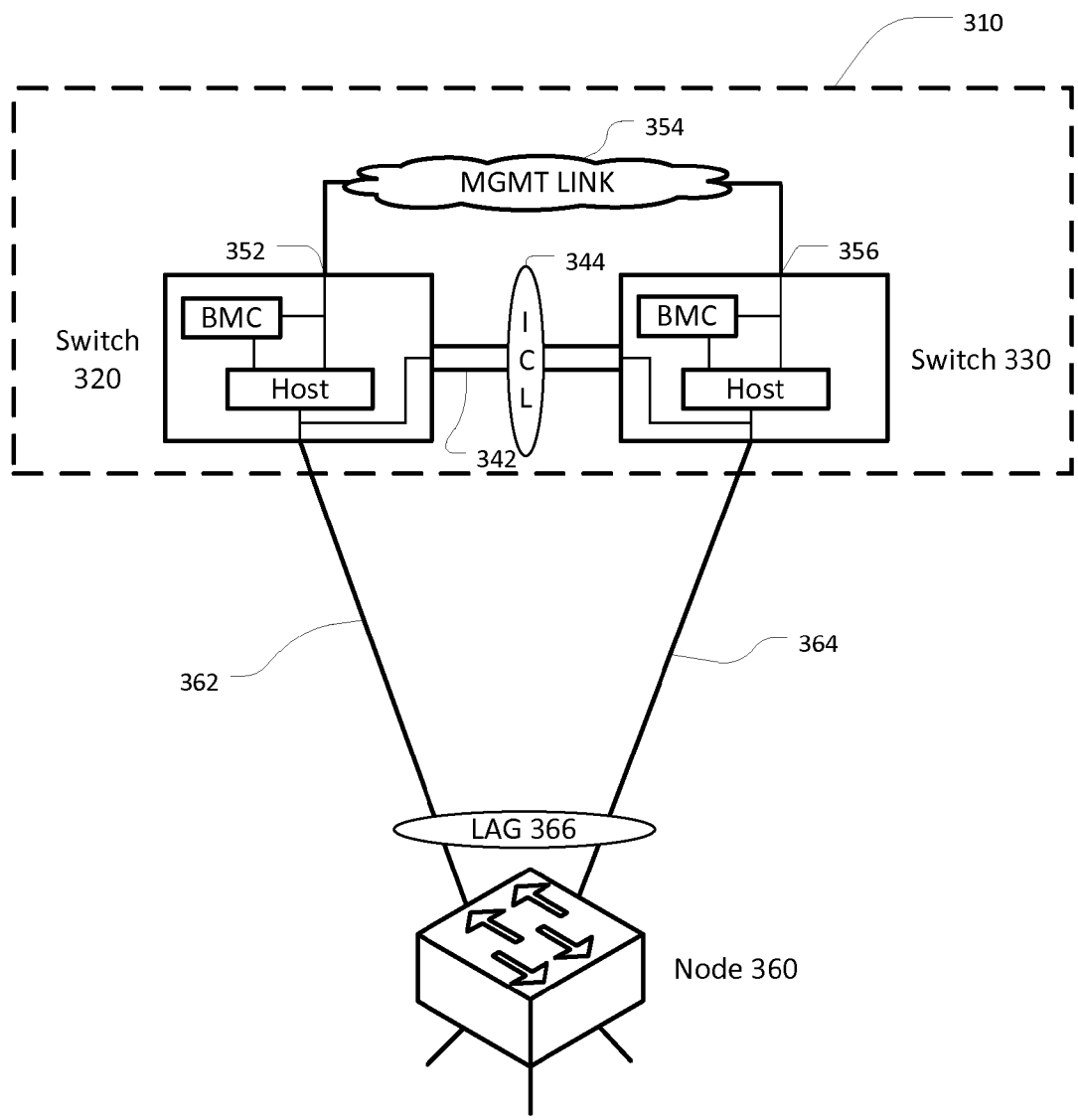
FIG. 3 shows a simplified diagram of a network peer domain according to some embodiments.

FIG. 3 shows a simplified diagram of a network peer domain 310 according to some embodiments. As shown in FIG. 3, the network peer domain or cluster 310 may include a first network switching unit or switch 320 and a second network switching unit or switch 330. In some examples, the switches 320 and 330 may be peer nodes or peer switches. In some examples, the switch 320 may be a first switch 200. In some examples, the switch 330 may be a second switch 200. The switch 320 may include one or more ports coupled to one or more corresponding network links 342. In some examples, the one or more ports may be selected from the one or more ports 252 of the first switch 200 and the one or more corresponding network links 342 may be the one or more network links 254. Similarly, the switch 330 may include one or more ports coupled to corresponding ones of the one or more network links 342. In some examples, the one or more ports may be selected from the one or more communication ports 250 of the second switch 200 and the one or more corresponding network links 342 may be the one or more network links 254. Together, the network links 342 may form an ICL 344 between the switch 320 and the switch 330. In some examples, the ICL 344 may be the ICL 256. The ICL 344 may be used by either the switch 320 or the switch 330 to share routing, forwarding, and other configuration information. In some examples, this information may include MAC, ARP, and/or multicast entries and the like. In some examples, this information may be exchanged periodically between the switches 320 and 330 to allow for proper ongoing operation of the network peer domain 310. In some embodiments, the ICL 344 may additionally be used to provide a path for forwarding network traffic being handled by either of the switches 320 or 330.

In some embodiments, the switch 320 may also include a connection 352 for coupling the switch 320 to a separate management link 354. In some examples, the connection 352 may be the one or more communication ports 260 of the first switch 200 and the management link 354 may be the network link 262. Similarly, the switch 330 may also include a connection 356 for coupling the switch 330 to the management link 354. In some examples, the connection 356 may be the one or more communication ports 260 of the second switch 200. In some embodiments, the management link 354 may provide a redundant mechanism for the switch 320 and the switch 330 to communicate that is separate from the network links 342 and the ICL 344. In some embodiments, the management link 354 may be an Ethernet. In some embodiments, the management link 354 may use any suitable communication network type. According to some embodiments, the switch 320 and the switch 330 may use the management link 354 to monitor a status of its peer switches. In some examples, switch 320 may monitor the status of its peer switch 330. In some examples, the switch 330 may monitor the status of its peer switch 320.

According to some embodiments, the network peer domain 310 may be coupled to one or more neighboring network switching units or nodes. FIG. 3 shows a representative node 360. Node 360 may be coupled to switch 320 using a network link 362 and to switch 330 using a network link 364. In some examples, the network link 362 may be the one or more network links 252 of the first switch 200 and the network link 364 may be the one or more network links 252 of the second switch 200. The node 360 may combine the network links 362 and 364 into a LAG 366, thus treating its connections to the network peer domain 310 as a VLT.

In some embodiments, because the switches 320 and 330 may each be one of the switches 200, each of the switches 320 and 330 may include a host CPU, a BMC, and the other elements of switch 200. In some embodiments, the BMC of the switches 320 and 330 may monitor a status of their respective host CPUs and other switch 200 components and then generate and send a failure notification message as needed to their peer switch 330 or 320 respectively. Thus, the switches 320 and 330 of the network peer domain 310 of FIG. 3 may be able to more rapidly detect and notify peers of a switch failure than the switches 120 and 130 of the network peer domain 110 of FIG. 1.

As discussed above and further emphasized here, FIGS. 1 and 3 are merely examples, which should not unduly limit the scope of the claims. One of ordinary skill in the art would recognize many variations, alternatives, and modifications. According to some embodiments, the network peer domain 110 and/or the network peer domain 310 may include more than two switches acting as peers. In some examples, the management link 154 and/or the management link 354 may be shared among all of the switches so that a failure in one of the switches may be communicated to the other switches in the network peer domain. According to some embodiments, more than one network link may be used to couple the node 160 and/or the node 360 to each of the switches 120, 130, 320, and/or 330.

Figure 4:
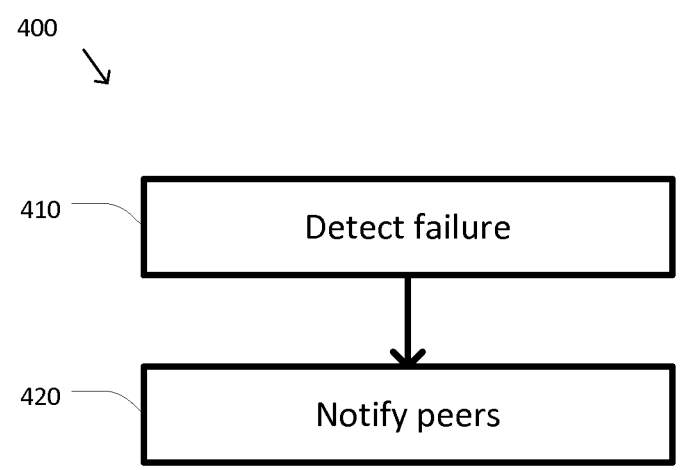
FIG. 4 is a simplified diagram showing a method of rapid peer node failure detection according to some embodiments.

FIG. 4 is a simplified diagram showing a method 400 of rapid peer node failure detection according to some embodiments. As shown in FIG. 4, the method 400 includes a process 410 for detecting a failure in a switch and a process 420 for notifying peer switches of the switch failure. According to certain embodiments, the method 400 of rapid peer node failure detection can be performed using variations among the processes 410-420 as would be recognized by one of ordinary skill in the art. In some embodiments, one or more of the processes 410-420 of method 400 may be implemented, at least in part, in the form of executable code stored on non-transient, tangible, machine readable media that when run by one or more processors (e.g., the host CPU 210, the BMC 230, and/or other processors in the switches 200, 320, and/or 330) may cause the one or more processors to perform one or more of the processes 410-420.

At the process 410, a failure may be detected in a switch (e.g., the switches 200, 320, and/or 330). In some embodiments, the failure may include an operating system failure in a host CPU of the switch. In some embodiments, the failure may include an operating system hang in the host CPU of the switch. In some embodiments, the failure may include a process watchdog timer timeout in a host CPU of the switch. In some embodiments, the failure may include a shutdown operation in the switch. In some embodiments, the failure may include an external watchdog timer timeout in the switch. In some embodiments, the failure may include a failure and/or other problem detected using IPMI. In some embodiments, the failure may be detected by a BMC (e.g., the BMC 230) included in the switch.

At the process 420, the switch may notify its peers of the failure. In some embodiments, the switch 320 may notify its peer switch or peer node 330. In some embodiments, the switch 330 may notify its peer switch or peer node 320. In some embodiments, the BMC of the switch may generate and send a failure notification message to the peers. In some embodiments, the failure notification message may be sent using a management link (e.g., the management link 354).

According to some embodiments, the failure notification message may be sent as quickly as 100 ms or less after the failure in the switch depending upon the type of failure and the configuration of corresponding timeout periods.

Some embodiments of switches 200, 320, and 330 may include non-transient, tangible, machine readable media that include executable code that when run by one or more processors (e.g., the host CPU 210 and/or the BMC 230) may cause the one or more processors to perform the processes of method 400 as described above. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network switching unit in a network peer domain, the network switching unit comprising:
a network processing unit configured to receive and forward network traffic using one or more ports;
a host central processing unit (CPU) coupled to the network processing unit and configured to manage the network processing unit;
a link controller coupled to the host CPU and configured to couple the network switching unit to a peer network switching unit using a management link, the link controller being separate and independent from the network processing unit; and
a baseboard management controller (BMC) coupled to the host CPU and the link controller, during normal operation, the BMC being configured to:
monitor the host CPU and the network switching unit;
detect a failure of the network switching unit;
determine whether the failure results in a loss of an ability of the network switching unit to forward network traffic in accordance with configuration information; and
when it is determined that the failure results in the loss of the ability of the network switching unit to forward network traffic in accordance with the configuration information, notify the peer network switching unit of the detected failure using the management link, wherein the peer network switching unit is configured to maintain operation of the network peer domain in response to the detected failure.

2. The network switching unit of claim 1 wherein the failure includes an operating system failure in the host CPU.

3. The network switching unit of claim 1 wherein the failure includes an operating system hang in the host CPU.

4. The network switching unit of claim 1 wherein the failure includes a process watchdog timer timeout in the host CPU.

5. The network switching unit of claim 1 wherein the failure includes a shutdown operation of the network switching unit.

6. The network switching unit of claim 1 wherein the failure includes a watchdog timer timeout in the network switching unit.

7. The network switching unit of claim 1 wherein the failure is detected in hardware coupled to the BMC using a system management bus.

8. The network switching unit of claim 7 wherein the system management bus is an Inter-Integrated Circuit (I2C) bus.

9. The network switching unit of claim 1 wherein the BMC is further coupled to the network switching unit using an Intelligent Platform Management Interface (IPMI).

10. The network switching unit of claim 1 wherein:
the BMC is further configured to:
receive an interrupt triggered by the failure; and
execute an interrupt handler; and
the interrupt handler is configured to notify the peer network switching unit.

11. The network switching unit of claim 1 wherein the network switching unit is configured to be further coupled to the peer network switching unit by an inter chassis link (ICL) including a selected one or more of the ports.

12. The network switching unit of claim 1 wherein the BMC is further configured to:
create a failure notification message; and
send the failure notification message to the peer network switching unit using the management link.

13. The network switching unit of claim 1 wherein the peer network switching unit is notified of the failure within 500 ms of an occurrence of the failure.

14. The network switching unit of claim 13 wherein the peer network switching unit is notified of the failure within 250 ms of an occurrence of the failure.

15. The network switching unit of claim 14 wherein the peer network switching unit is notified of the failure within 100 ms of an occurrence of the failure.

16. The network switching unit of claim 1 wherein the BMC is powered independently of the host CPU and the network processing unit.

17. The network switching unit of claim 1 wherein the network switching unit and the peer network switching unit comprise a network peer domain.

18. A method of failure notification using a baseboard management controller (BMC), the method comprising:

monitoring a network switching unit in a network peer domain, the network switching unit including:
  a network processing unit for receiving and forwarding network traffic using one or more ports; and
  a host central processing unit (CPU) coupled to the network processing unit and configured to manage the network processing unit;
detecting a failure of the network switching unit;
determining whether the failure results in a loss of an ability of the network switching unit to forward network traffic in accordance with configuration information; and
when it is determined that the failure results in the loss of the ability of the network switching unit to forward network traffic in accordance with the configuration information, notifying a peer network switching unit of the detected failure, the peer network switching unit being coupled to the BMC using a management link controlled by a link controller that is separate and independent from the network processing unit, wherein the peer network switching unit is configured to maintain operation of the network peer domain in response to the detected failure.

19. The method of claim 18, further comprising:
creating a failure notification message; and
sending the failure notification message to the peer network switching unit using the management link.

20. An information handling system comprising:
a network switching unit in a network peer domain, the network switching unit comprising:
  a network processing unit configured to receive and forward network traffic using one or more ports;
  a host central processing unit (CPU) coupled to the network processing unit and configured to manage the network processing unit;
  a link controller coupled to the host CPU and configured to couple the network switching unit to a peer network switching unit using a management link, the link controller being separate and independent from the network processing unit; and
  a baseboard management controller (BMC) coupled to the host CPU and the link controller, the BMC being configured to:
    monitor the host CPU and the network switching unit;
    detect a failure of the network switching unit;
    determine whether the failure results in a loss of an ability of the network switching unit to forward network traffic in accordance with configuration information; and
    when it is determined that the failure results in the loss of the ability of the network switching unit to forward network traffic in accordance with the configuration information, notify the peer network switching unit of the detected failure using the management link, wherein the peer network switching unit is configured to maintain operation of the network peer domain in response to the detected failure.

* * * * *